UNITED STATES PATENT OFFICE.

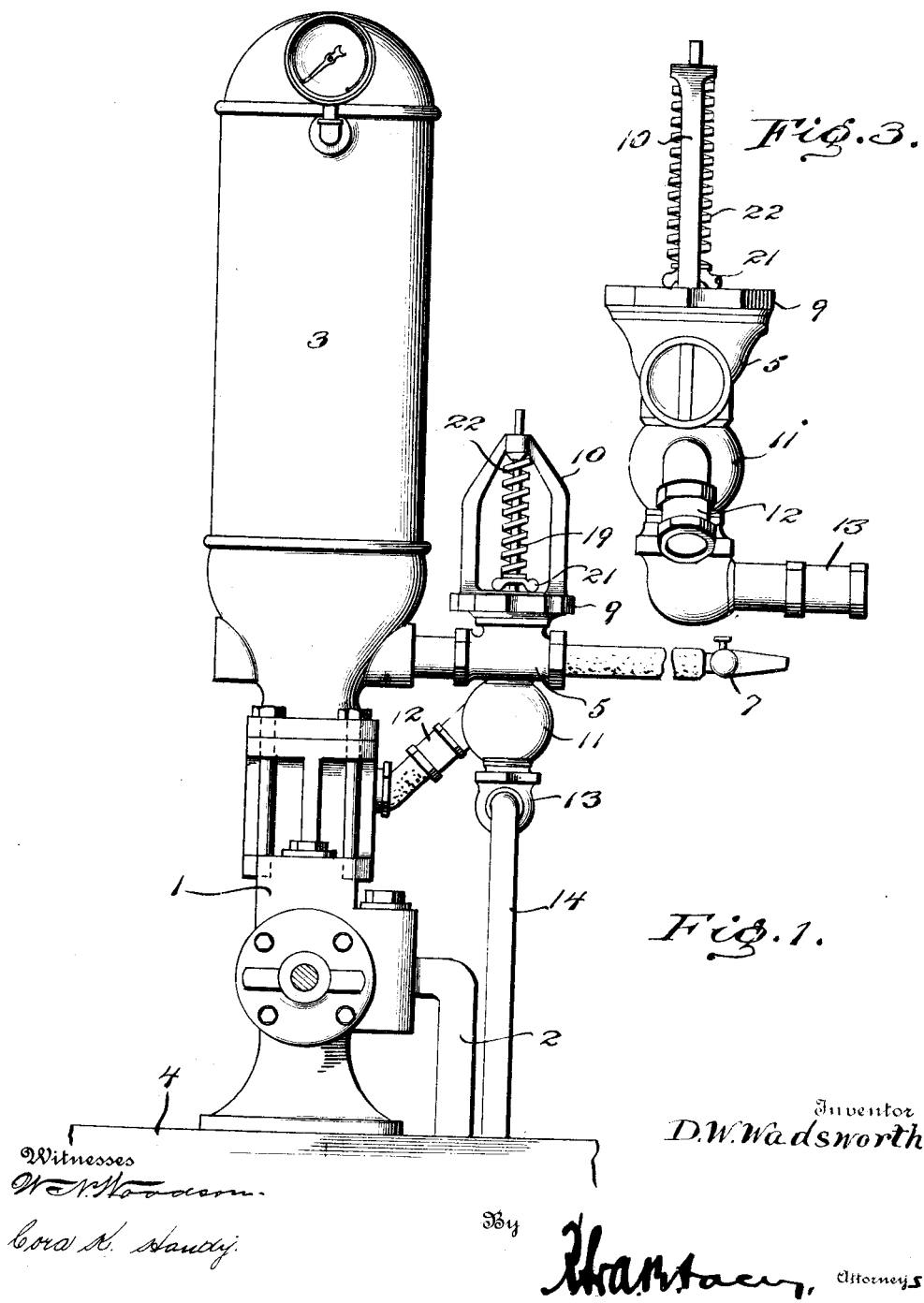

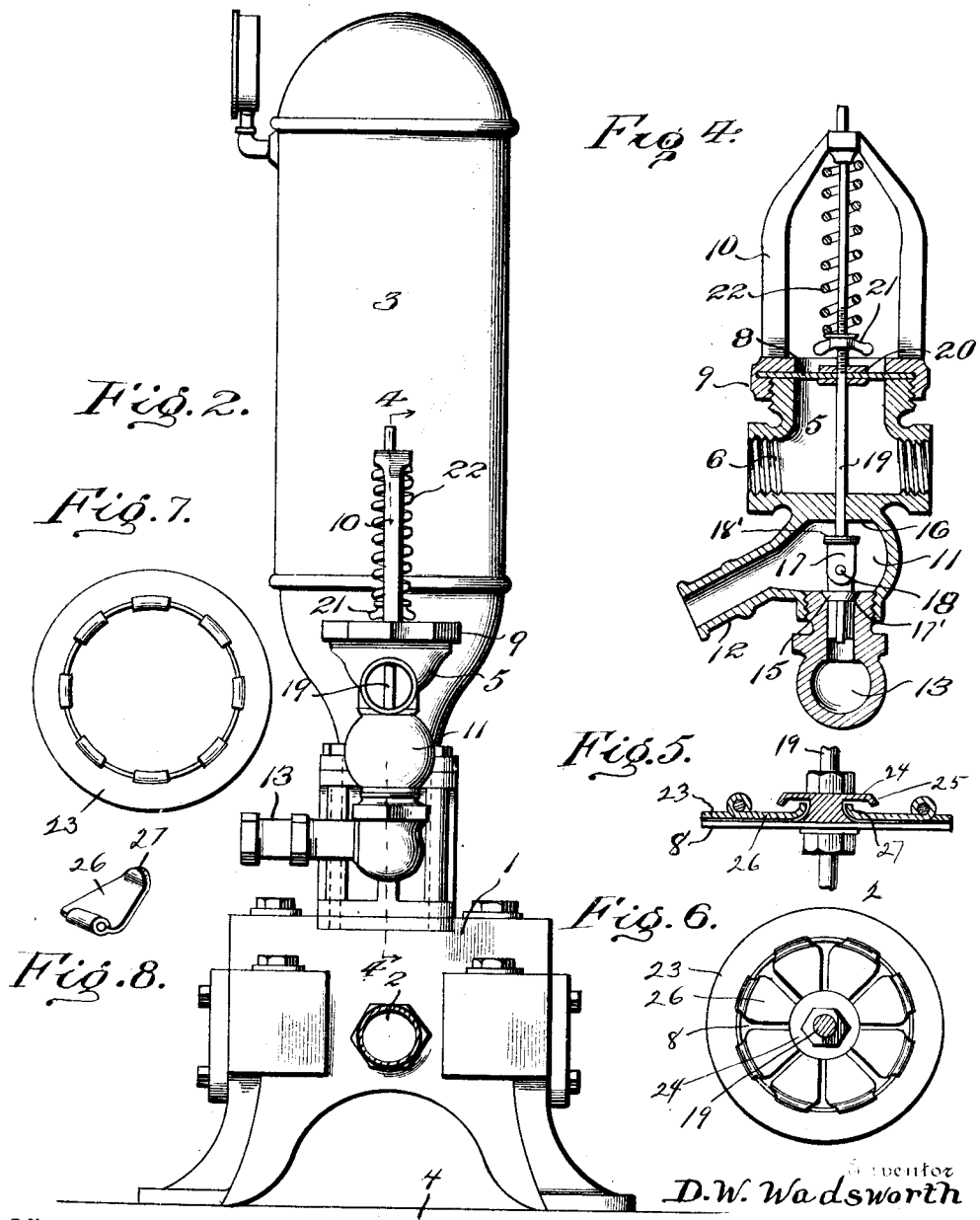

DWIGHT W. WADSWORTH, OF BANGOR, MICHIGAN.

RELIEF-VALVE FOR SPRAYING-PUMPS.

1,031,214.  Specification of Letters Patent.  Patented July 2, 1912.

Application filed April 13, 1911. Serial No. 620,907.

*To all whom it may concern:*

Be it known that I, DWIGHT W. WADSWORTH, citizen of the United States, residing at Bangor, in the county of Van Buren and State of Michigan, have invented certain new and useful Improvements in Relief-Valves for Spraying-Pumps, of which the following is a specification.

This invention has relation to relief valves for spray pumps, and is an improvement over the structure shown in my prior patent granted August 31, 1909, Number 932,520.

The object of the present invention is to simplify the relief valve structure by eliminating parts which were necessary in my prior structure and by compactly assembling the new arrangement, whereby an effective and at the same time durable structure is provided.

With this object in view, the relief valve includes a body having a fluid pressure passage therethrough which is adapted to be connected with the air chamber of a pump. A retractable diaphragm is located upon the body and subjected to the pressure of the fluid therein. A valve chamber is connected with the body and is also provided with a fluid pressure passage which is connected with the air chamber of the pump. A valve is located in the chamber and is arranged to engage a seat provided in the fluid passage therein and a valve stem connects the said valve with the diaphragm.

For a full understanding of the invention reference is to be had to the following description and accompanying drawings, in which:

Figure 1 is a side elevation of a pump with the relief valve applied thereto; Fig. 2 is a similar view of the pump, viewing the same at a right angle to the view illustrated in Fig. 1; Fig. 3 is a detail side elevation of the valve; Fig. 4 is a vertical sectional view of the valve cut on the line 4—4 of Fig. 2; Fig. 5 is a transverse sectional view of an improved diaphragm used in the relief valve; Fig. 6 is a top plan view of the same; Fig. 7 is a plan view of a ring which serves as a part of the same; Fig. 8 is a perspective view of a sector plate used upon the same.

Corresponding and like parts are referred to in the following description and indicated in all the views of the accompanying drawings by the same reference characters.

As illustrated in the accompanying drawings, the pump 1 is provided with an intake pipe 2 and is adapted to discharge into the lower portion of an air chamber 3. The said pump is designed to be used for spraying purposes and consequently is mounted upon a wheel supporting tank, indicated at 4. Any suitable means may be provided for operating the pump, but in such cases the pump is usually driven by an engine, and when the apparatus is moved from point to point in an orchard, it is desired to cut off the fluid to the spraying nozzles, at the same time it is desired that the engine should continue to run. Therefore the present relief valve is so constructed that when the discharge nozzles leading from the pump are cut off, the back pressure will be sufficient to operate the relief valve to cause the pump to discharge back into the tank.

The relief valve consists of a body 5 having a fluid pressure passage 6 therethrough, one end of which is connected with the lower portion of the air chamber 3 and the other end of which is connected with the spraying nozzles, indicated at 7. A diaphragm 8 is mounted upon the body 5 and forms a closure for a portion thereof. A ring 9 is screwed upon one side of the body 5 and bears against the periphery of the diaphragm 8 and serves as means for holding the diaphragm in position upon the body. A yoke 10 is supported upon the ring 9 and is part of the same casting. A valve chamber 11 is attached to the body 5, it preferably being formed in the same casting. The said chamber 11 is provided with an inlet hose nipple 12 which is connected with the air chamber 3, and an outlet hose nipple 13 which is connected to a hose 14 adapted to discharge back into the tank 4. The fluid pressure passageway through the valve chamber 11 is provided with a valve seat 15 and at the opposite side of the chamber 11 is provided a ground valve seat 16. A check valve 17' of the ordinary puppet type pivotally connected at 18 with a stem 19 is located in the chamber 11, and is adapted to engage the seat 15.

At the upper end of valve connection 17 is placed a small rubber gasket or washer 18' which is adapted to engage the seat 16. The only object of this washer is to provide against any possible leakage from the chamber 5 to the chamber 11, when the stem 19 becomes worn in use while passing through the partition between the chambers 5 and 11. It also acts as a cushion to the shock when the valve opens suddenly. The stem 19 slidably passes through the top of the chamber 11 and up through the body 5, the diaphragm 8 and the upper intermediate portion of the yoke 10. The intermediate portion of the said stem 19 is fixed to the diaphragm 8 by means of plates 20 which are adjustably secured upon the intermediate portion of the said stem and which bear against the opposite sides of the said diaphragm, clamping the same in position. A wing nut 21 is screw threaded upon the intermediate portion of the stem 19 above the diaphragm 8, and a coil spring 22 is interposed between the said wing nut and the upper intermediate portion of the yoke 10. The spring 22 is under tension with a tendency to hold the wing nut and the valve stem 19 in a lowered position. Therefore it will be seen that when the pump 1 is in operation and the liquid is passed from the tank 4 through the pipe 2 into the air chamber 3, and from thence into the body 5 and thence out at the nozzles, the diaphragm is subjected to a minimum pressure from the said liquid and consequently will remain approximately in a plane so that the valve stem 19 is held in a lowered position and the lower end of the check valve 17' held against the seat 15 of the fluid pressure passage through the chamber 11. However, as soon as the nozzles are cut off and the pump still continues to operate, the pressure in the body 5 becomes abnormal and the diaphragm 8 is bowed in a direction away from said pressure. Thus the valve stem 19 is moved longitudinally, and the valve 17' is carried away from the seat 15 and the washer 18' engages the seat 16, thereby preventing any leakage around the stem 19 while the check valve is open. Thus through the nipples 12 and 13 and the connecting pipes communication is established from the pump 1 back into the tank 4, and the liquid is circulated through the pump and returned to its source of supply. During this interval the apparatus may be transported from one place to another without stopping the operation of the pump.

As soon as one or more of the nozzles 7 are opened, pressure in the body 5 is decreased and the tension of the spring 22 comes into play and forces the diaphragm 8 back into an approximate plane which carries with it the valve stem 19, and the valve 17' is moved in a direction away from the seat 16 and the check valve 17' engages the seat 15. The surfaces of the valve 17' and its extension 17 that are exposed to the pressure of the liquid from the pump 1 are of less combined area than the exposed surface of the diaphragm 8, consequently the valve 17' will move promptly away from the seat 15 when the diaphragm 8 is subjected to abnormal pressure. By pivotally connecting the valve at the point 18, the check valve will snugly engage the seat 15 even though there should be a slight variation from the proper line of movement on the part of the stem 19.

Figs. 5, 6, 7 and 8 illustrate the features of a bracing device for the diaphragm 8. This brace includes a ring 23 which is placed over the upper edge portion of the diaphragm 8. A retaining cap 24 is attached to the stem 19 above the diaphragm 8 and is provided with a downwardly disposed peripheral flange 25. Sector plates 26 are hingedly attached at their outer ends to the ring 23 and at their inner ends are provided with upwardly disposed extremities 27 which bear against the under side of the cap 24 within the flange 25. As the diaphragm 8 is expanded the free ends of the plates 26 will move under the cap 24 and brace the diaphragm against the strain.

In the following claim the chamber is described as being isolated from the body. By this it is meant that the interior of the chamber is not in direct communication with the interior of the body.

Having thus described the invention, what is claimed as new is:—

A relief valve comprising a body having a fluid pressure passage and a valve chamber and a partition between the pressure passage and the valve chamber, a yoke mounted upon the body, a diaphragm mounted upon the body and forming a part of the fluid pressure passage, a valve located in the valve chamber, a stem connected to the valve and passing through the partition between the valve chamber and the pressure passage, said stem passing through the diaphragm and being guided in the yoke.

In testimony whereof, I affix my signature in presence of two witnesses.

DWIGHT W. WADSWORTH. [L. S.]

Witnesses:
L. H. WADSWORTH,
F. W. PALMER.